(No Model.) 6 Sheets—Sheet 1.
F. WYNNE.
APPARATUS FOR THE APPLICATION OF ELECTRICITY TO PROPEL VEHICLES.
No. 401,322. Patented Apr. 9, 1889.
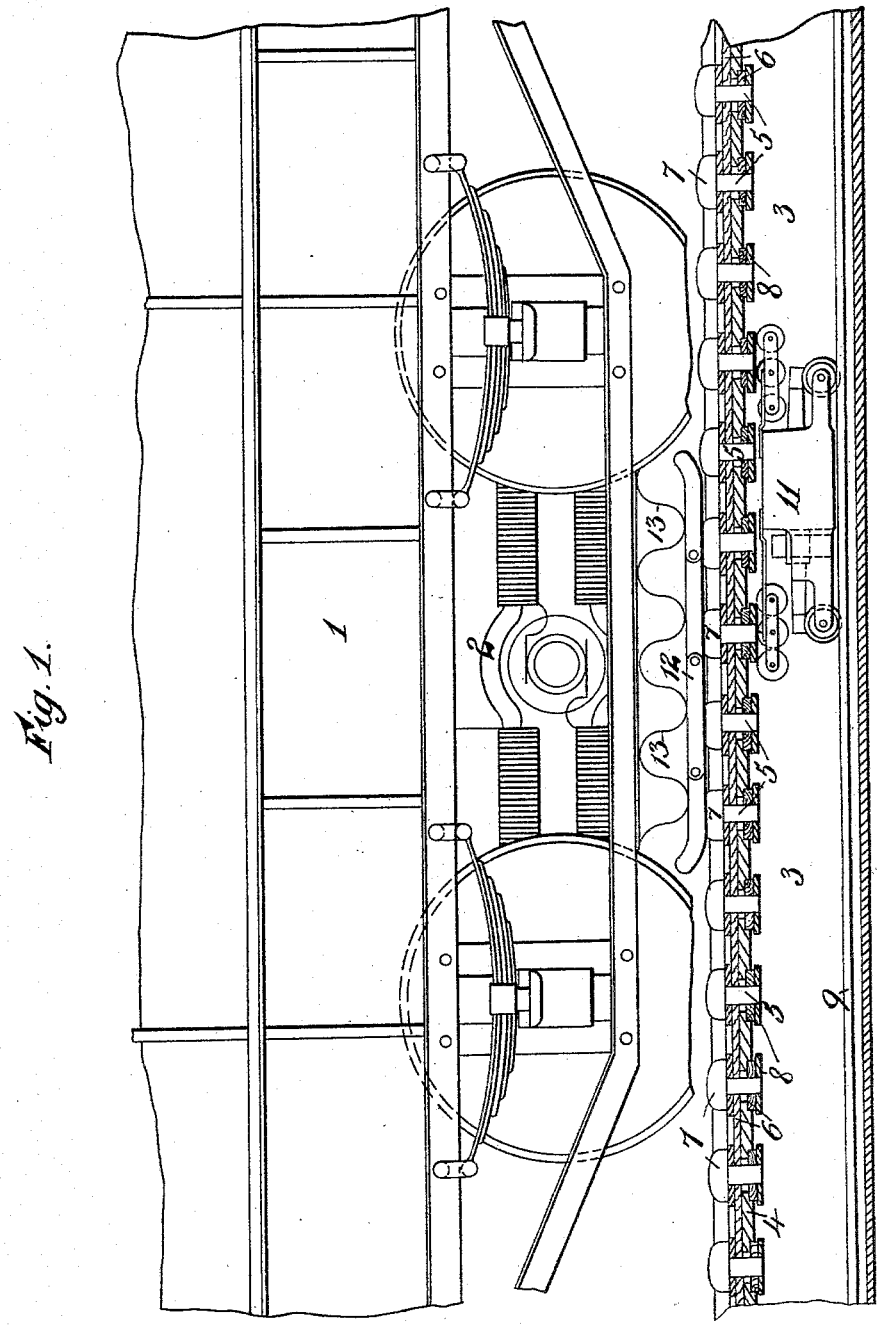
Witnesses.
Charles E. Brougham
Wm Cross
Inventor.
Frank Wynne

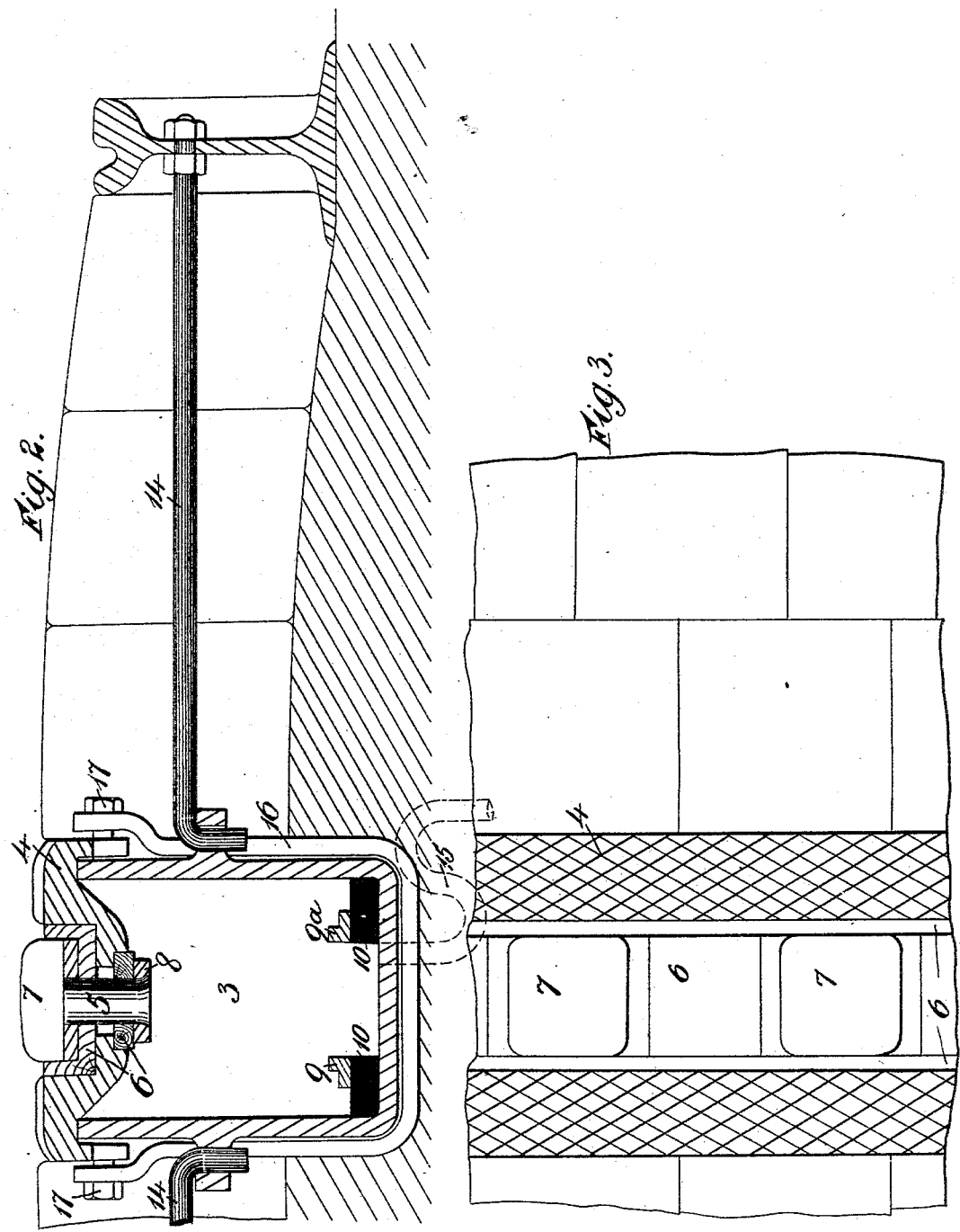

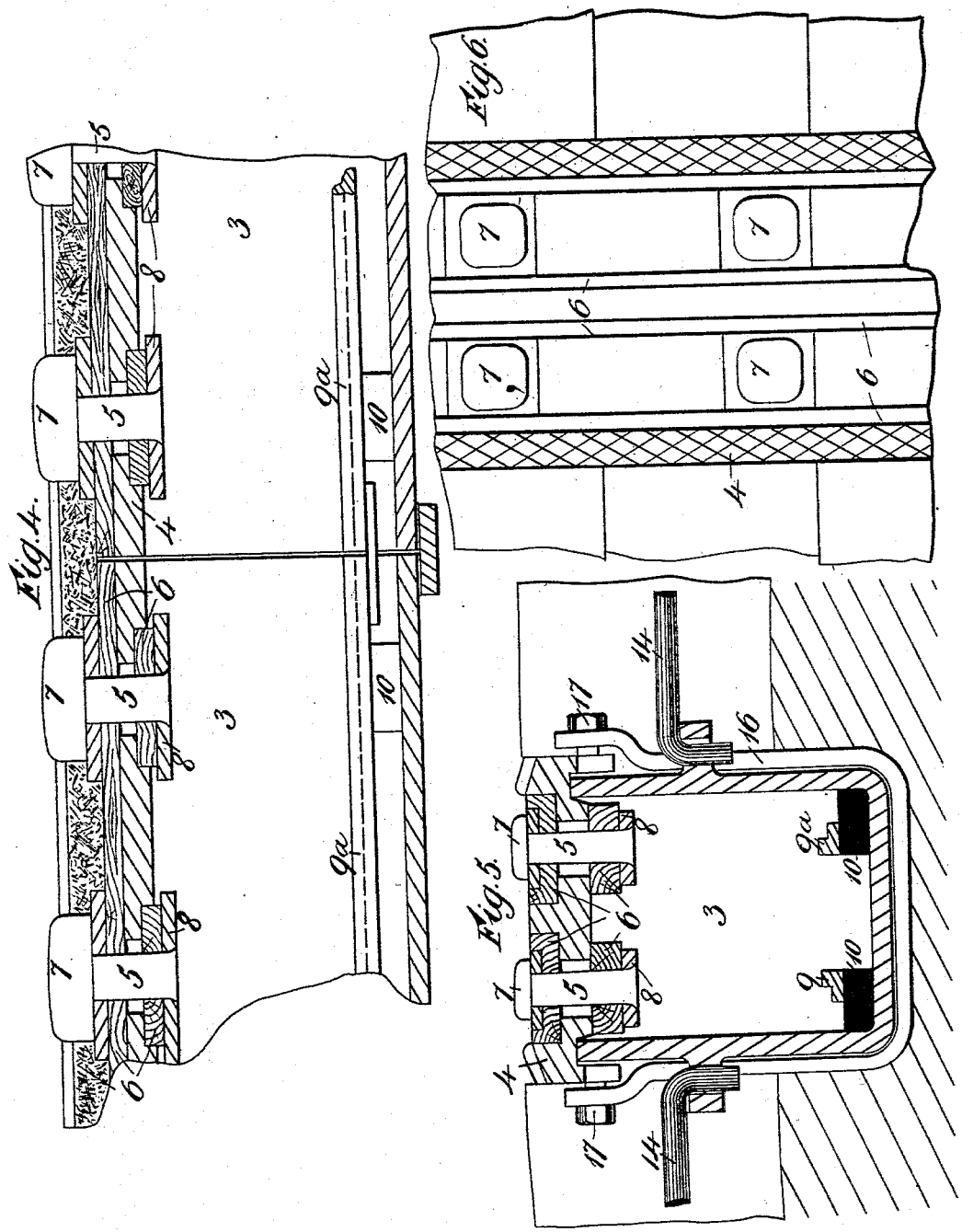

(No Model.) 6 Sheets—Sheet 4.
F. WYNNE.
APPARATUS FOR THE APPLICATION OF ELECTRICITY TO PROPEL VEHICLES.
No. 401,322. Patented Apr. 9, 1889.
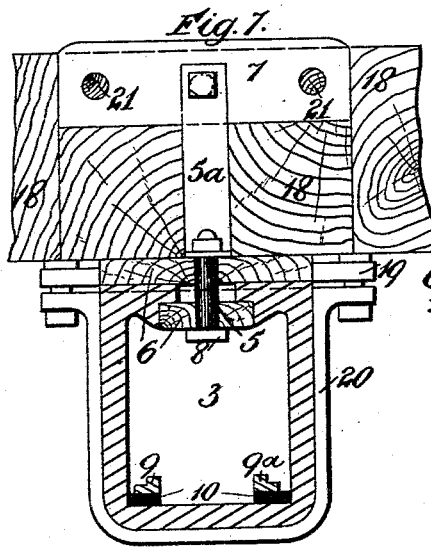
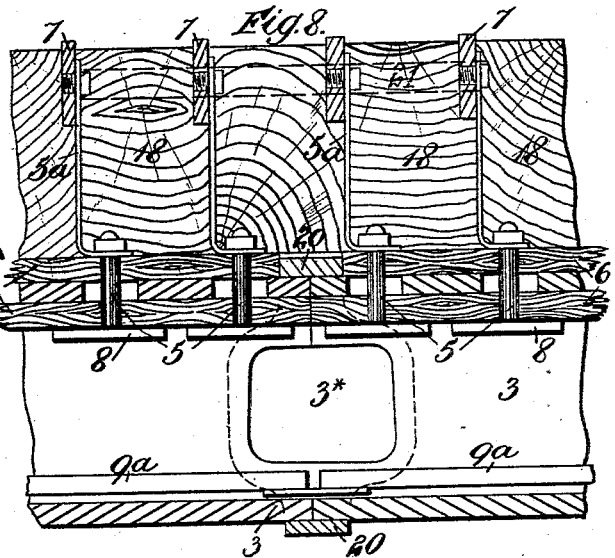
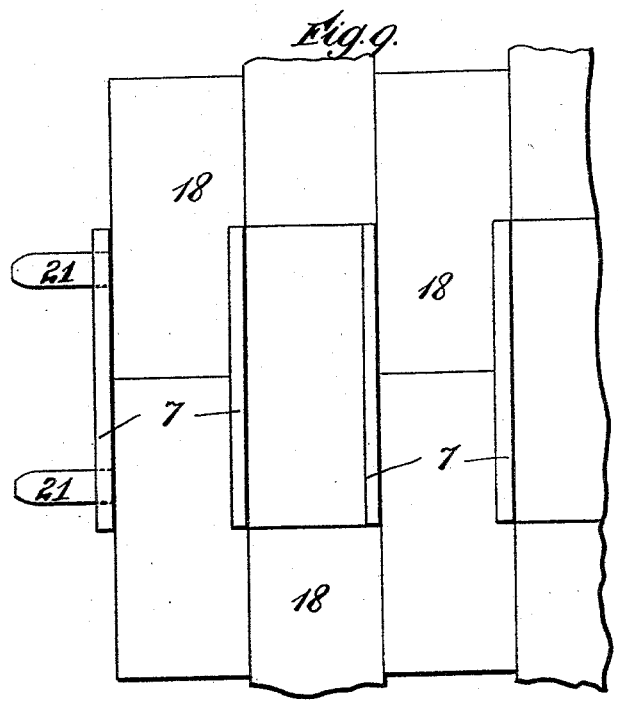
Witnesses.
Charles E. Brougham.
Wm Cross
Inventor.
Frank Wynne

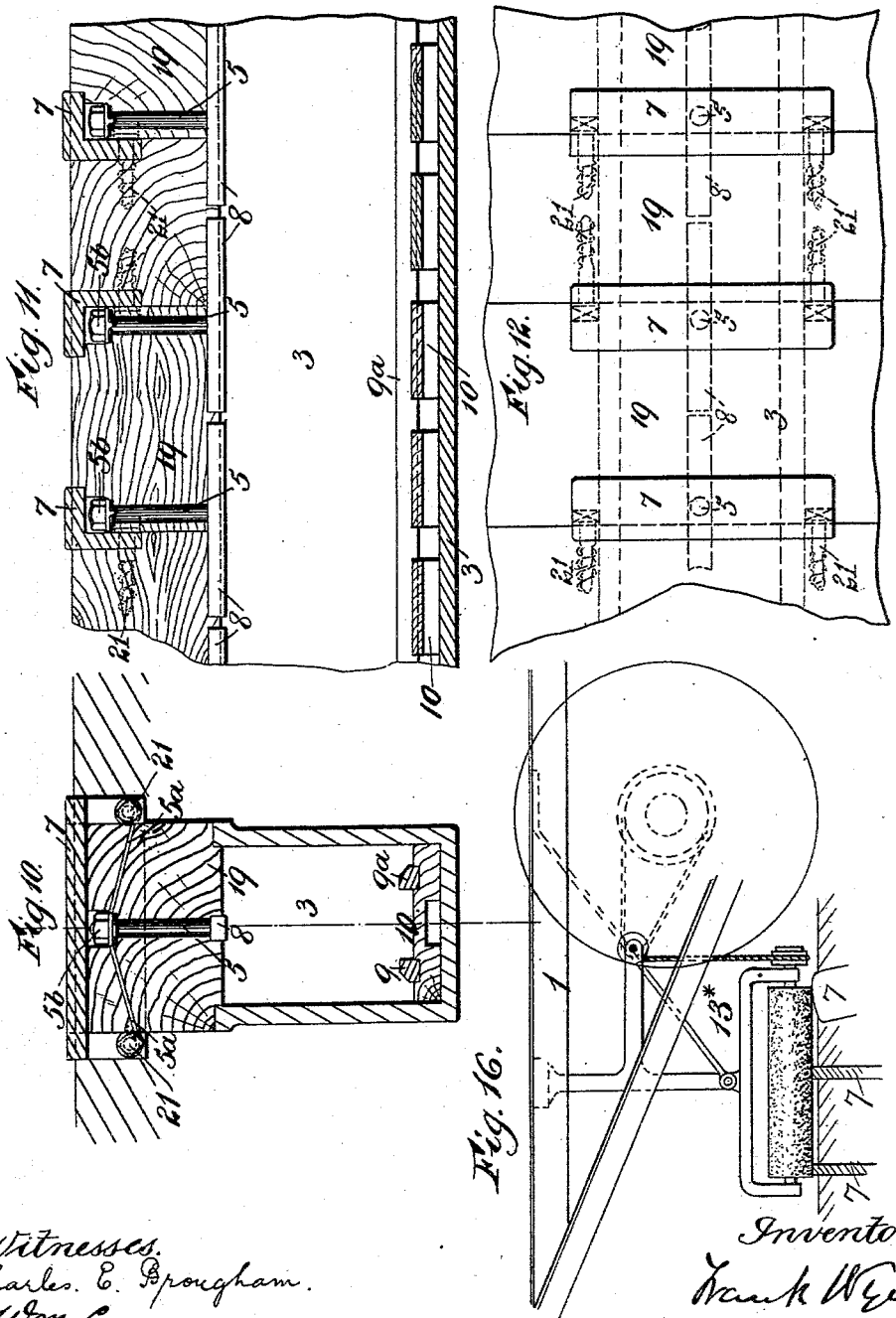

(No Model.) 6 Sheets—Sheet 6.
F. WYNNE.
APPARATUS FOR THE APPLICATION OF ELECTRICITY TO PROPEL VEHICLES.
No. 401,322. Patented Apr. 9, 1889.
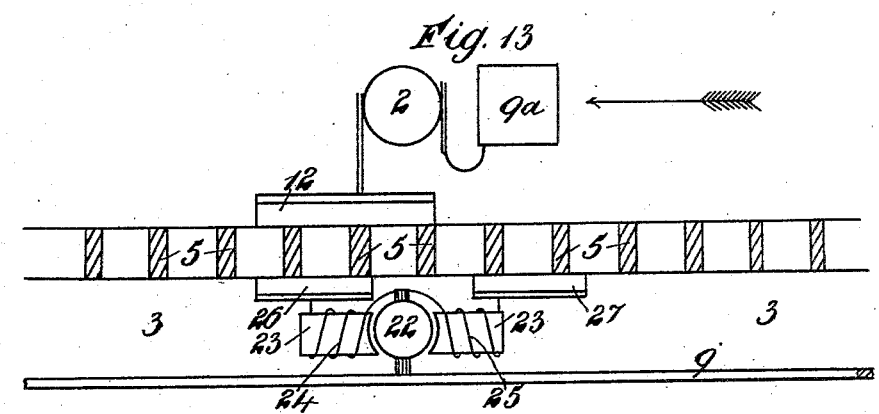
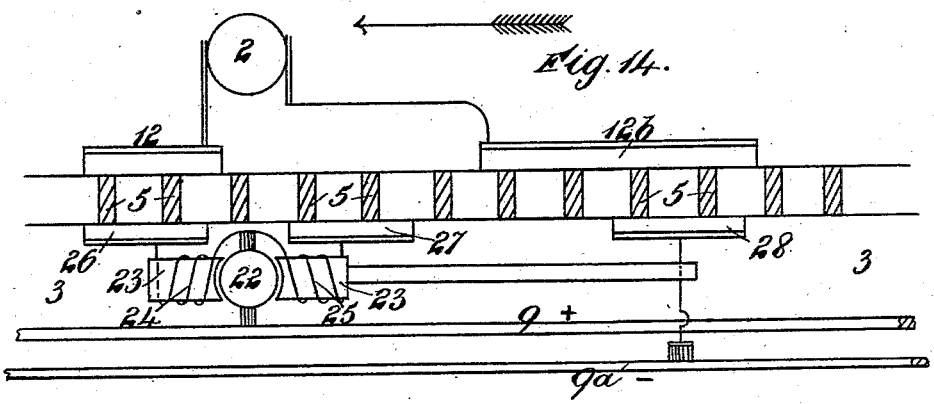
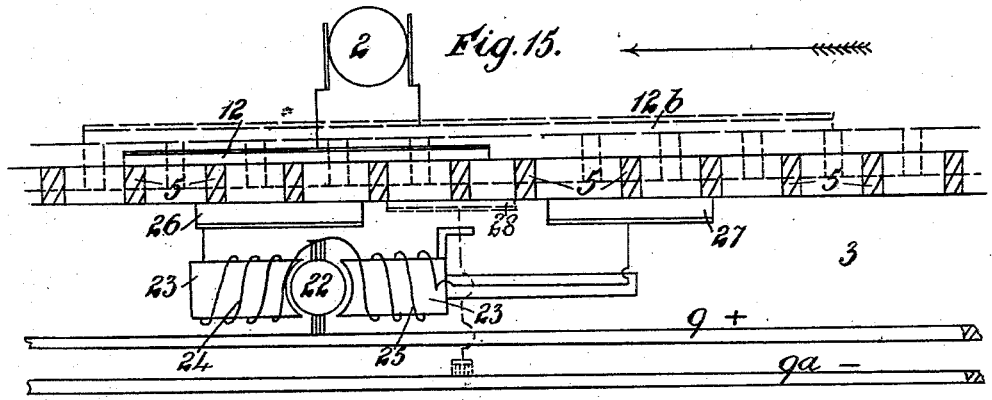
Witnesses.
Charles. E. Brougham.
Wm Cross.
Inventor.
Frank Wynne

United States Patent Office.

FRANK WYNNE, OF WESTMINSTER, COUNTY OF MIDDLESEX, ENGLAND.

APPARATUS FOR THE APPLICATION OF ELECTRICITY TO PROPEL VEHICLES.

SPECIFICATION forming part of Letters Patent No. 401,322, dated April 9, 1889.

Application filed June 6, 1887. Serial No. 240,419. (No model.) Patented in England July 15, 1886, No. 9,215; in Germany January 27, 1887, No. 41,326; in France March 9, 1887, No. 182,077; in Belgium September 2, 1887, No. 78,757, and in New South Wales October 4, 1887, No. 235.

*To all whom it may concern:*

Be it known that I, FRANK WYNNE, a subject of the Queen of Great Britain and Ireland, residing at Westminster, in the county of Middlesex, Kingdom of Great Britain and Ireland, have invented Improvements in Apparatus for the Application of Electricity to Propel Vehicles on Tramways and Railways, (which have been patented as follows: Great Britain, No. 9,215, dated July 15, 1886; Germany, No. 41,326, dated January 27, 1887; France, No. 182,077, dated March 9, 1887; Belgium, No. 78,757ᴅ, dated September 2, 1887, and New South Wales, No. 235, dated October 4, 1887,) of which the following is a specification.

This invention has reference to improvements in the application of electricity to propel vehicles on tram and rail ways according to the mode or method in which the electricity is derived from a producer or reservoir of electricity, and there are employed a covered channel containing a bare main conductor of electricity (with or without a special return in the channel) and a series of insulated contact-surfaces exposed in the said channel and connected electrically to a series of insulated contacts exposed in the road upon which the car or vehicle to be propelled travels; and in order that the nature of my invention and the manner in which it can be conveniently carried into practical effect may be readily, clearly, and fully understood, I append six sheets of illustrative drawings, with the aid of which I proceed to describe my improvements.

Referring to these drawings, Figure 1 shows in side elevation part of a car or vehicle fitted with a motor for propelling it and with a contact-making device, and in longitudinal section a channel with insulated metallic contact-pieces, an insulated main conductor of electricity, and an electrically-propelled contact-maker, (hereinafter called a "carrier,") which progressively connects the main conductor with the row of metallic contact-pieces. Fig. 2 is a transverse section illustrating the construction of the closed channel with conductors and one row of electrically-insulated metallic contacts, whose upper ends are exposed in the roadway. It also illustrates the adjacent part of the roadway with means for tying the tram-rails together through the channel, and with means for draining the channel. Fig. 3 is a plan or top view, and Fig. 4 is a longitudinal vertical section, of the channel. Figs. 5 and 6 are respectively a transverse section and a plan or top view showing a channel provided with two rows of metallic contacts. Figs. 7 and 8 are respectively a transverse section and a longitudinal vertical section illustrating a modified construction of the closed channel with main conductor and metallic contacts, whose upper ends are exposed in the roadway shown paved with blocks of wood. Fig. 9 shows in plan a piece of roadway with such an arrangement of contacts. Figs. 10, 11, and 12 are similar views to Figs. 7, 8, and 9, illustrating a modification. Figs. 13, 14, and 15 are diagrammatic views; and Fig. 16, a detail view showing a rotary brush attachment.

The several figures are drawn to various scales.

Referring to Figs. 1 to 4, inclusive, 1 is a car or vehicle, which may be of any suitable construction, and in the example shown is arranged to travel on rails.

2 is an electric motor, hereinafter called a "car-motor," which may be of any suitable kind, as well understood, for propelling the vehicle through suitable gear when the motor is in circuit.

3 is a channel, made, by preference, of cast or wrought iron in lengths with a metal cover, 4. This cover may be removable, as shown, or be formed in one with the channel. The cover has fixed in it contacts 5, made in the form of studs or rivets with suitably-shaped heads passed through the cover at frequent intervals apart. The studs are insulated from the cover by bushes and strips 6, of suitable material, such as wood.

7 7 are the parts of the contacts exposed in the roadway. 8 8 are the parts of the contacts exposed within the channel 3. These contacts exposed in the road may be constructed in a variety of forms, so long as they are made short, and frequent in the direction of the length of the road on which the car or vehicle is to be propelled. This is essential, as will be explained hereinafter. It is through these contacts, exposed in the road, that the electrical circuit has to be completed, so that the current conducted from the conductor in the closed channel through the carrier to the under side of the contacts in the closed channel may be brought to the surface of the road, so as to be available to work the motor of the vehicle to be propelled; but, as will be evident, it is necessary that the ordinary traffic of the street should be practically protected from contact with the electrically-charged metallic contact-pieces exposed in the roadway; and this may be effected, according to my invention, by so arranging the contacts that those that are electrically charged may, for the time being, be situate under (i. e., covered by) the car or vehicle, or practically so. It is desirable not to permit the charging with electricity of any contact, if not actually covered or adequately protected by the vicinity of the car, as will be evident if the condition of (for example) a tram-car standing in a crowded thoroughfare be taken into consideration. Therefore it is that I prefer to so arrange my contacts (however constructed) that the number of electrically-charged contact-pieces for the time being shall be such that they may be all under the car or vehicle, so as to be efficiently and practically protected by it, though in some cases, during the working, one or more of the charged contacts may be exposed at either end of the car.

9 9ª are bare main insulated conductors of electricity; but one of them—say 9ª—may be used as the return-conductor when a special metallic return is employed, as shown in the diagrammatic views, Figs. 14 and 15. Where metallic rails in the roadway are not used as the return-conductor to complete the circuit, the return-conductor may be in the channel, as illustrated in the said diagrammatic views, or the channel itself, if electrically connected up, may under certain circumstances be employed as the return-conductor.

10 10 are sleepers or supports of non-conducting material (they may be of wood or be stoneware tiles) secured to the bottom of the channel at intervals. They support the conductors 9 and 9ª.

11 is an electrically-propelled carrier or contact-maker that travels on the conductors 9 and 9ª, which serve as rails therefor. Its sliding or rolling contacts bear against the parts 8 exposed in the channel 3.

The construction of an electrically-propelled carrier with sliding or rolling contacts suitable for use in a closed channel with contacts arranged according to this invention forms the subject of another application for a United States Patent, bearing even date herewith, and serially numbered 240,420. The vehicle travels on rails or otherwise on the road above, and its rolling or sliding contact 12 (which in the example illustrated is in the form of a chain with the links electrically connected by flexible conductors) travels in contact with the contact-surfaces 7 of the contacts 5 exposed in the road.

13 is a corrugated strip of metal electrically connected at its lower bends with the separate links of the chain to insure good electrical connection between the links of the latter and prevent sparking at the joints and at its upper part with the car-motor 2. It also serves to keep the chain 12 in close elastic contact with the parts 7 of the contacts 5. Other forms of car-contacts—such as metal brushes—may, however, be used, if desired; also, the carrier may be arranged to run on other rails than those serving as the main conductor. A rotary brush, 13, may be so mounted and arranged on the vehicle that when such vehicle is in motion it is rotated and brushes the surface of the parts 7 or road-contacts transversely, thereby cleaning them and enabling good contact to be obtained between such contacts and the car-contact 12. In some cases, however, this rotary brush may be dispensed with. Where two lines of tramway cross each other one of the two channels may either cross each other on a level, or one may dip below the other and then rise to its normal level. Where the brush or car contact from a vehicle on one line of tramway crosses the rails of another line, if an earth-return be used, that part of the tram-rail with which the car-contact comes into contact should be insulated.

14 14, Fig. 2, are tie-rods, by which the tram-rails may be tied across through the channel 3.

15 is a siphon-pipe (shown in dotted lines in Fig. 2) in communication with a drain, whereby the channel 3 may be drained of water that may gain access thereto.

In the modification shown in Figs. 5 and 6 the channel 3 is provided with two rows of contacts, 5, the parts 7 of which may be arranged side by side, as shown, or be arranged alternately. Each row of road-contacts 5 in either arrangement may be arranged in a straight line or in a zigzag line. In each arrangement the removable cover 4 is held in place by a strap, 16, and screws 17, as shown. The strap also serves to close the joint between two adjacent lengths of channel-pipe.

In the modification illustrated in Figs. 7, 8, and 9, which is suitable for a road paved with blocks of wood, 18, the pipe or channel 3 is shown as made without a removable cover, in lengths of pipe of suitable material, such as cast-iron. The lengths of pipe are placed with their ends abutting against one another and are secured together by strap-clips 19 and 20. With this arrangement, as well as with that illustrated in the preceding figures, one length of pipe may be readily removed without disturbing its neighbors.

3* is a hand-hole in the channel 3 for gaining access to the interior of the channel when desired—as, for instance, for making the joints between adjacent lengths of the conductors 9 and 9ª. It is formed by removing parts of the adjacent ends of two lengths of pipe, and is normally closed by one of the strap-clips 20, as shown; or the necessary opening may be provided by leaving the lengths of pipe a short distance apart, and be closed by a ring or by straps forming a sleeve-joint. The contacts shown in this modification comprise bolts 5, with T-heads 8, which constitute the contacts exposed in the channel, and plates 7, of metal, placed transversely of the road with exposed upper edges, the parts 7 and 8 being electrically connected by metallic strips 5ª, which are preferably made elastic or yielding with the bolts 5. 6 6 are insulating material, as before.

I sometimes find it convenient to fasten the plates 7 to the paving sets by means of treenails 21, as shown.

In the modification shown in Figs. 10, 11, and 12 the top of the channel 3 is closed by wood blocks 19, in which the contacts 5 5, with T-heads 8, are secured by nuts 5ᵇ.

7 7 are the road-contacts in the form of transverse lengths of angle iron or steel arranged transversely of the channel. Each road-contact 7 is secured to a wood block adjacent to the one in which the corresponding contact, 5, is secured by screws 21 21. Each contact 5 is electrically connected to its road-contact 7 by a metallic conductor, 5ª—as, for example, a length of wire, as shown. In some cases a number of contacts, 5, with road-contacts 7, may be secured in a single balk of wood. The channel 3 may in each of the arrangements shown be tightly closed and a current or plenum of drying air or gas be maintained therein, the tendency of which is to dry up rather than to deposit moisture. By this means good electrical insulation and clean contact-surfaces in the channel are insured.

The diagrammatic views, Figs. 13, 14, and 15, illustrate arrangements of an electrically-propelled reversible carrier with series motor for completing the car-motor circuit progressively through the insulated contacts 5 in the channel 3.

In Fig. 13, 9 represents the bare main conductor; 9ª, an earth-return effected through the frame-work and wheels of the vehicle and the tram-rails; 22, the carrier-motor armature; 23, field-magnet of carrier-motor; 24 25, windings in opposite directions on the said field-magnet 23; 26 27, contact-pieces in electrical connection with the windings 24 25, respectively; 12, car-contact piece; 2, car-motor; 3, channel in which carrier runs, and 5 5 insulated stud-contacts passing through the top of the channel and provided with exposed contact-surfaces in the channel and in the roadway.

The action of the motor for controlling the movement of the carrier for completing the circuit progressively as the vehicle travels along the road is as follows: Supposing the car-motor and carrier to be traveling at the same velocity in the direction indicated by the arrow and to be in the relative positions indicated, the electric current passes from the main conductor through the wheels of the carrier to the motor-armature 22, field-winding 24, contact-piece 26, contacts 5 5, contact-piece 12 to car-motor 2, and thence to earth-return 9ª. As long as the velocity of the vehicle and carrier is approximately equal within moderate limits, the course of the current above mentioned will be continued. If, however, from any cause the carrier should begin to outrun the vehicle, the contact-piece 27 will be placed in electrical connection with the contact-piece 12 through one or more of the contacts 5. Under these conditions part of the current, after passing through the armature 22, will pass through the field-winding 25, contact-piece 27, contact piece or pieces 5, and car-contact 12 to car-motor, and thence to earth, thereby causing the field-winding 25 to exert a neutralizing effect on the field-winding 24 and reducing or neutralizing the field in which the armature works, and thereby its propelling-power.

Should the momentum of the carrier from any cause—such as the sudden stopping of the vehicle—carry the contact-piece 26 out of electrical connection with the car-contact 12 through the contacts 5, the contact-piece 27 will be placed in electrical connection with contact 12, and the whole of the current will then pass through the field-winding 25, reversing the direction of rotation of the armature, and thus bring back the carrier to its normal position relative to the vehicle.

Fig. 14 shows an arrangement similar to that shown in Fig. 13, but with a special metallic return-conductor, 9ª, laid in the channel, and which, for convenience, I take to be negative, and mark with the minus sign. For this purpose the vehicle carries a second contact-piece, 12ᵇ, in electrical connection with the negative pole of the car-motor, and the carrier carries an additional contact-piece, 28, insulated therefrom but in contact with 9ª. With this arrangement each contact 5 serves successively to first conduct the current from the positive main conductor to the car-motor 2, and afterward to conduct the current from such motor to a negative or return conductor in the channel 3.

Fig. 15 is a similar view to Fig. 14, but with the car-contact 12ᵇ made longer than the car-contact 12, and arranged sidewise thereof, the two car-contacts being in rubbing contact with two rows of road-contacts, such as hereinbefore described with reference to Figs. 5 and 6. This method of arranging the car-contacts is specially suitable for use when the car-motors of successive vehicles are worked in series.

In cases where it is not convenient to place the channel in the roadway directly beneath the road-contacts the channel may be placed in any other convenient position, the channel-contacts 5 being then electrically connected to the road-contacts 7 through suitable insulated and preferably elastic or flexible conductors.

It will be seen that in the several arrangements illustrated in Figs. 13, 14, and 15 the relative arrangement of rubbing contacts is such that at least two contacts, 5 5, are always in connection with each rubbing or sliding contact of the carrier, so that should one of such contacts fail the system will still continue to work; also, that there is at least one idle contact-piece between two consecutive rubbing contacts of the carrier in whatever position it may be.

In the specification of my United States Patent No. 324,447, A. D. 1885, I have shown and described road-contact bars placed in close proximity to each other and of considerable length compared with the road-contacts hereinbefore described and shown in the accompanying drawings. By making the contacts 5 short and frequent in the direction of the length of the channel or of the road on which the vehicles are to be electrically propelled and in the manner hereinbefore described, the following advantages are obtained over the arrangement shown in the specification of my said former United States Patent. A number of such contacts may be caused to be in contact with one or other of the rubbing or rolling contacts of the traveling carrier or contact maker without the necessity of making such carrier or contact-maker of an inconvenient length, so that should one of such contacts fail a current will still be supplied through the remainder to the car-motor. One or more idle-contacts, 5, may be always maintained between the carrier-contacts, thus preventing one of the windings being improperly excited by the current leaking between the road-contacts, and in case of the accidental electrical connection between two of the road-contacts preventing this having an improper retarding effect on the movement of the carrier, and while by spacing the road-contacts 7 at a considerable distance from each other as compared with my previous arrangement I secure better insulation of same and secure them better against being accidentally electrically connected by small pieces of conducting material—such as a horseshoe or a coin, &c.—thus the contacts in connection (for the time being) with the main conductor can be readily kept under the car or vehicle with less liability than heretofore of electrically-charged road-contacts extending beyond such car or vehicle to the danger of other traffic.

What I claim is—

1. In apparatus for the application of electricity to propel cars or vehicles, the combination, with a pipe or covered channel, of stationary insulated contact studs or rivets having parts 7, exposed in the road along which cars or vehicles are to be electrically propelled, and parts exposed in said channel, said contact studs or rivets being so arranged that said exposed parts 7 are short and frequent in the direction of said road but not in close proximity, substantially as herein described, for the purpose set forth.

2. In apparatus for the application of electricity to propel cars or vehicles, the combination of a covered channel, stationary insulated contact studs or rivets having parts exposed in said channel, and contact parts 7, exposed in the road along which cars or vehicles are to be propelled, and metallic connections between said contact studs or rivets and said contact parts 7, said exposed parts 7 being made short and frequent in the direction of said road but not in close proximity, substantially as herein described, for the purpose set forth.

3. In apparatus for the application of electricity to propel cars or vehicles, the combination of a covered channel, stationary insulated contact studs or rivets arranged at frequent intervals apart and having parts exposed in said channel, metallic contact bars or plates 7, exposed in and arranged transversely to the road along which cars or vehicles are to be propelled, said exposed bars or plates 7 being made short and frequent in the direction of said road but not in close proximity, and metallic connections between said contact studs or rivets and said contact bars or plates 7, substantially as herein described, for the purpose set forth.

4. Apparatus for the application of electricity to propel cars or vehicles, comprising pipe or channel 3, contacts 5 5, with electrically-connected contact-surfaces exposed in the pipe or channel and in the road on which the cars or vehicles are to be propelled, insulating material 6, strap-clips 19 and 20, rails or conductors 9 and $9^a$, and insulating-supports 10, all substantially as herein described, for the purposes specified.

5. In apparatus for the application of electricity to propel cars or vehicles, the combination of lengths of pipe or channel 3, with removable cover 4, straps 16, and screws 17, said straps 16 adapted to hold said cover 4 in place and to close the joint between adjacent lengths of pipe or channel, substantially as herein described.

In testimony whereof I have signed my name to this specification in the presence of two subscribing witnesses.

FRANK WYNNE.

Witnesses:
CHARLES E. BROUGHAM,
WM. CROSS,
*Both of 46 Lincoln's Inn Fields, London, W.C.*